(12) United States Patent
Krishnan

(10) Patent No.: US 8,160,074 B1
(45) Date of Patent: Apr. 17, 2012

(54) OPTIMAL READING OF FORWARDING DATABASE FROM HARDWARE

(75) Inventor: Ram Krishnan, Sunnyvale, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 268 days.

(21) Appl. No.: 12/415,996

(22) Filed: Mar. 31, 2009

(51) Int. Cl.
*H04L 12/56* (2006.01)
*G06F 17/30* (2006.01)
*G06F 15/00* (2006.01)

(52) U.S. Cl. ............ 370/395.31; 370/400; 707/999.003; 709/242

(58) Field of Classification Search ................... None
See application file for complete search history.

(56) References Cited

U.S. PATENT DOCUMENTS

| | | | |
|---|---|---|---|
| 6,438,130 B1 * | 8/2002 | Kagan et al. ................. 370/392 |
| 2001/0000356 A1 * | 4/2001 | Woods ............... 707/1 |
| 2005/0216534 A1 * | 9/2005 | Ikezawa et al. ............... 707/204 |
| 2005/0262071 A1 * | 11/2005 | Prager ............... 707/4 |
| 2010/0185584 A1 * | 7/2010 | Vendrow et al. ............... 707/622 |

* cited by examiner

*Primary Examiner* — John Pezzlo
*Assistant Examiner* — Matthew Campbell
(74) *Attorney, Agent, or Firm* — Blakely, Sokoloff, Taylor & Zafman, LLP

(57) ABSTRACT

Forwarding database entries in a memory of a network device are scanned. Each port on the network device maintains a forwarding database in the memory. A filtered list of forwarding database entries is automatically sent to a management module.

9 Claims, 3 Drawing Sheets

OPTIMAL READING OF FORWARDING DATABASE FROM HARDWARE

FIELD

Embodiments described herein relate to Ethernet forwarding entries and, more particularly, to reading forwarding entries from a database in hardware.

BACKGROUND

A common task performed by network devices is to forward packet traffic on a network. To do this, network devices typically maintain a forwarding database that might include a table of forwarding addresses and corresponding ports. An example of network packet forwarding includes the use media access control, or MAC, addresses to route and/or forward packet traffic on a network. Forwarding packet traffic in hardware (i.e., directly accessing forwarding entries in hardware for forwarding purposes) is typically much faster than forwarding packet traffic in software. Because of this, it is desirable to maintain a forwarding database in hardware.

It may also be desirable, for a network administrator to monitor a network (e.g., for the purpose of maintaining the network). One component of monitoring a network might include reviewing entries in the forwarding database. To accomplish this, the network administrator can set up a forwarding database scan to read forwarding database entries that are stored in memory and send those entries back to a management module for display, allowing the network administrator to analyze the entries. One challenge with scanning a hardware-based forwarding database is that the address table is often organized as a hash table. This means that it is difficult to know where in memory a particular address, is stored. Another limitation is that there is often a maximum burst size of data that can be sent from a network device to a management module. For example, a network device may have an address space that is 512K in size, but the maximum burst size for sending data to the management module might only be 4K. Based on the constraints of the burst size, it is common to limit a forwarding database scan size to the maximum burst size. In other words, if the maximum burst size is 4K, then a scan might only read 4K addresses before terminating and returning the results to the management module.

Knowing that many forwarding database entries do not change between scans, it is not useful to return duplicate or previously read entries to the management module. However, by capping the scan size (e.g., to 4K), the resulting burst sent to the management module may be much smaller than the 4K burst size, given that many of the entries are either duplicates, or have been read previously.

SUMMARY OF THE DESCRIPTION

Each port on a network device maintains a forwarding database in a memory. Forwarding database entries stored in the memory are scanned. A filtered list of forwarding database entries is automatically sent to a management module. The filtered list may include only entries that have not previously been read, or entries that have changed, or entries that are to be deleted.

BRIEF DESCRIPTION OF DRAWINGS

The following description includes discussion of figures having illustrations given by way of example of implementations of embodiments of the invention. The drawings should be understood by way of example, not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

DETAILED DESCRIPTION

As provided herein, methods, apparatuses, and systems facilitate optimal reading of a forwarding database (or FDB) from hardware. Rather than perform a fixed-sized scan, various embodiments described herein perform scans based on a buffer threshold. In addition, various embodiments described herein filter entries that have been previously read so that only entries that have not been read will be sent back to a management module for analyzing.

Figure 1:
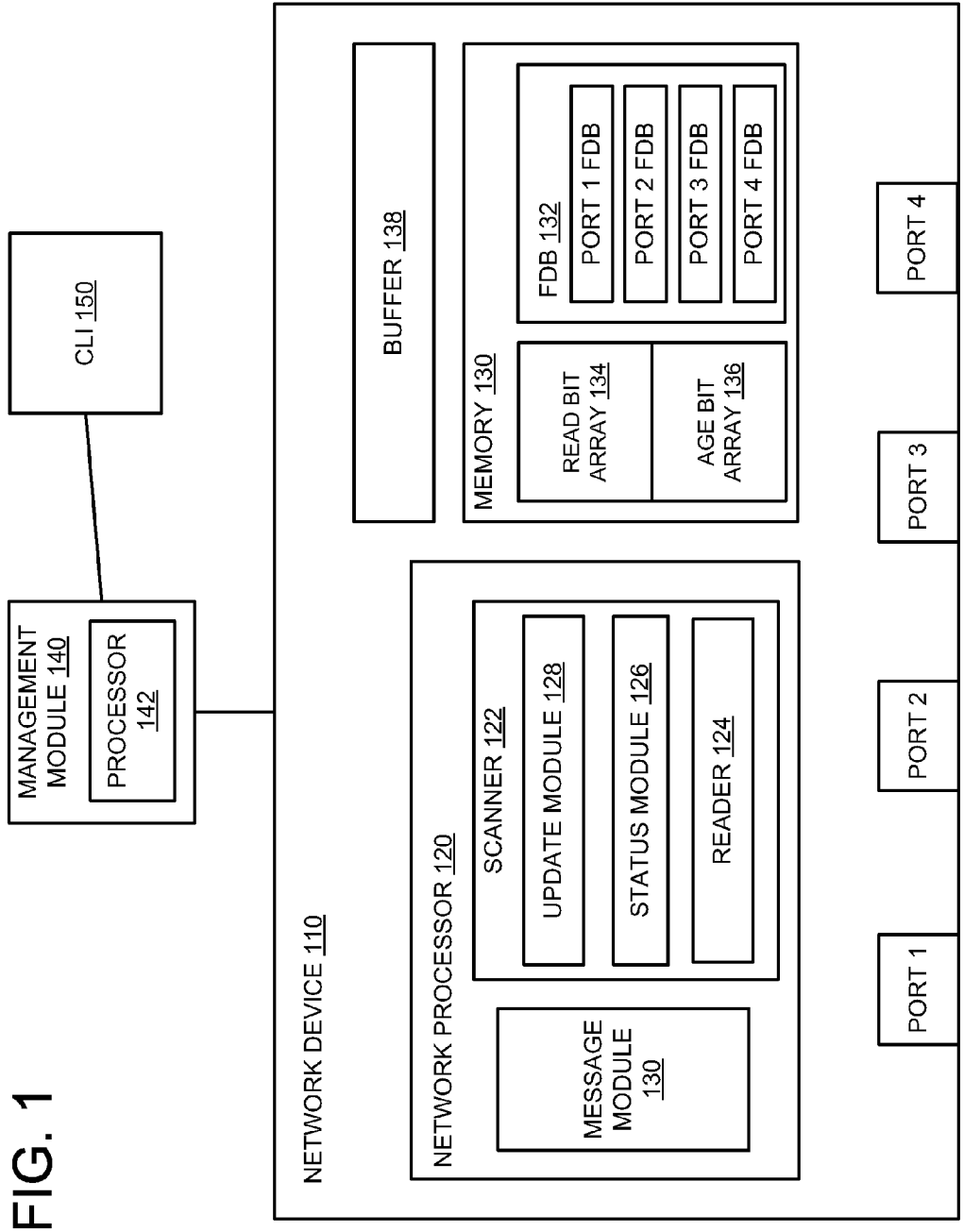
FIG. 1 is a block diagram illustrating a system according to various embodiments.

FIG. 1 is a block diagram according to various embodiments. Network device 110 is a device for routing and/or forwarding packet traffic on a network. A network device, as used herein, can be any device on a network that sends and/or receives network packet traffic. Examples of a network device include, for example, Open Systems Interconnection (OSI) layer 2 bridges, layer 3 switches (or "routers"), and other known routing/forwarding devices.

In various embodiments, the network device may operate on an Ethernet network that includes, for example a virtual local area network (VLAN). However, in other embodiments other types of networks could be used with the network device 110.

Network device 110 includes various ports, a network processor 120, and a memory 130. Network device 110 may be communicatively coupled and/or physically connected with other network devices to form a rack of network blades. The terms "coupled" and "connected" are used interchangeably herein and should not be construed to limit a particular embodiment as being either physically connected or only communicatively coupled, unless expressly limited as such.

As shown, network device 110 is coupled to a management module 140 that includes a processor 142. Interesting and/or useful information from network device 110 is sent to management module 140 for processing and/or analyzing. Command line interface (CLI) 150 may be used by a network administrator to control various functions related to management module 140 and/or to control functions of network device 110 (e.g., network settings, etc.).

Network traffic is routed through network device 110 using ports 1, 2, 3, and 4, as shown in FIG. 1. Each of the ports maintains a separate forwarding database (FDB) in memory 130. Thus, forwarding database 132 includes forwarding databases for port 1, port 2, port 3, and port 4. Forwarding entries can be learned, or stored, to forwarding database 132 by various forms of learning, including egress learning, ingress learning, etc. To illustrate an egress learning scenario, by way of example, a packet might arrive on port 2 of the device. In response, network device 110 performs a forwarding database lookup based on the destination address in the received packet to determine on which port to forward the data packet out of the device. In addition, port 2 records the source address of the packet into a forwarding database entry and associates the source address with port 2. In this way, future received packets having a destination address that matches the stored source address will be forwarded out on port 2 based on the FDB entry that links the source address with port 2. Thus, each time a packet flows through network device 110, an FDB entry is either added, or updated, in forwarding database 132.

Additionally, network device 110 maintains an aging counter that coincides with an aging-out process to remove forwarding database entries that are no longer useful, or valid.

Scanner 122 scans the FDB entries in memory 130. Scanner 122 may perform scans dynamically and/or automatically based on a specific request or schedule dictated by a user (e.g., network administrator). Scanner 122 includes a reader 124, a status module 126, and an update module 128. Reader 124 reads FDB entries from memory 130 and passes a read bit associated with each FDB entry to status module 126. In connection with FDB 132, memory 130 includes a read-bit array, which contains one bit for each FDB entry stored in memory 132. Each entry can be represented by a different number of bits in other embodiments.

The read bit indicates whether the associated entry stored in memory 130 has been previously read by reader 124. Status module 126 flags read bits associated with FDB entries that have not previously been read. If a read bit for an FDB entry is flagged as being unread, update module 128 updates the state of the flagged read bit to indicate that the FDB entry has now been read by reader 124. In a related action, update module 128 takes the address (e.g., the media access control, or MAC, address) associated with the FDB entry and puts the address in a buffer 138. By adding only addresses of FDB entries that have been flagged as being previously unread, the buffer will only include addresses of previously unread FDB entries.

Message module 130 monitors buffer 138. When buffer 138 reaches a threshold (e.g., when the buffer is full), message module 130 sends the contents of the buffer to management module 140. The functions and designs of management module 140 are beyond the scope of the present disclosure and will not be discussed further herein, except as they relate to various embodiments.

Given that each port on network devices 110 maintains a separate forwarding database in various embodiments, it is possible and even probable that multiple entries in each of the forwarding databases will be duplicates. For example, if a packet is received at port 2 and the source of the received packet is some node with the address X, it is also possible that port 3 receives a different packet from the same source X node. Thus, both port 2 and port 3 will have a forwarding database entry associated with the source X node in their respective forwarding databases. In various embodiments, it may not be useful to send duplicate address—even if they belong to different entries—back to management module 140. Thus, update module 128 is capable of propagating an updated read bit state to forwarding database entries in the memory having the same address (e.g., MAC address).

As an example, if reader 124 reads an FDB entry for port 2 associated with source X, update module 128 updates the state of the read bit associated with the source X entry to indicate that the source X entry has now been read. Update module 128 also adds the source X address to buffer 138. Additionally, update module 128 propagates this new read state to the respective bits in bit array 134 for each entry in FDB 132 that has the same source X address. In this way, when reader 124 subsequently reads, for example, a different entry in the forwarding database 132 associated with the source X address, the bit in bit array 134 for that entry will have already been updated to indicate that it has been read. The entry may, as a matter of fact, have not actually been read. However, by indicating that the entry has been read, the address is prevented from being added to the buffer as a duplicate.

In certain embodiments, whenever an FDB entry in forwarding database 132 is modified (e.g., when an existing entry is modified), an indication of the entry's modification is sent to update module 128. Update module 128 updates the state of the read bit associated with that FDB entry in read bit array 134 to indicate an unread state in response to the entry's modification. By changing the state of the read bit to an unread state, it triggers update module 128 to add the address associated with the entry to the buffer. Adding addresses of modified entries may provide a network administrator with more useful information about the dynamics and/or state of the network being monitored.

In addition to read scans, scanner 122 may also perform aging scans in certain embodiments. In an aging scan, scanner 122 scans the forwarding database entries in memory 130 to determine which entries, if any, need to be aged out, or deleted. In much the same way that the read scan is performed, the age scan may be performed by having reader 124 (or a similar module) read FDB entries in memory 130. Status module 126 determines the age status of an FDB entry based on an age-bit array 136, which, like the read-bit array 134, includes at least one bit for each entry in forwarding database 132. Age bit array 136 may include a different number of bits for each entry in other embodiments.

Based on the state of the age bit for a particular entry, status module 126 indicates that that entry needs to be deleted. It should be understood that either binary state (i.e., a "1" or "0") can be used to indicate an entry that is to be deleted. Furthermore, the particular process for determining when to set or change the state of the age bit in age-bit array 136 is beyond the scope of the disclosure.

When status module 126 determines that an FDB entry is to be deleted (i.e., based on the age bit), update module 128 updates the state of the read bit associated with the FDB entry in read-bit array 134 to indicate an unread state. Based on the unread state of the read bit, the address associated with the FDB entry is added to the buffer so that this information (i.e., the info about the deletion) can be sent to management module 140.

Figure 2A:
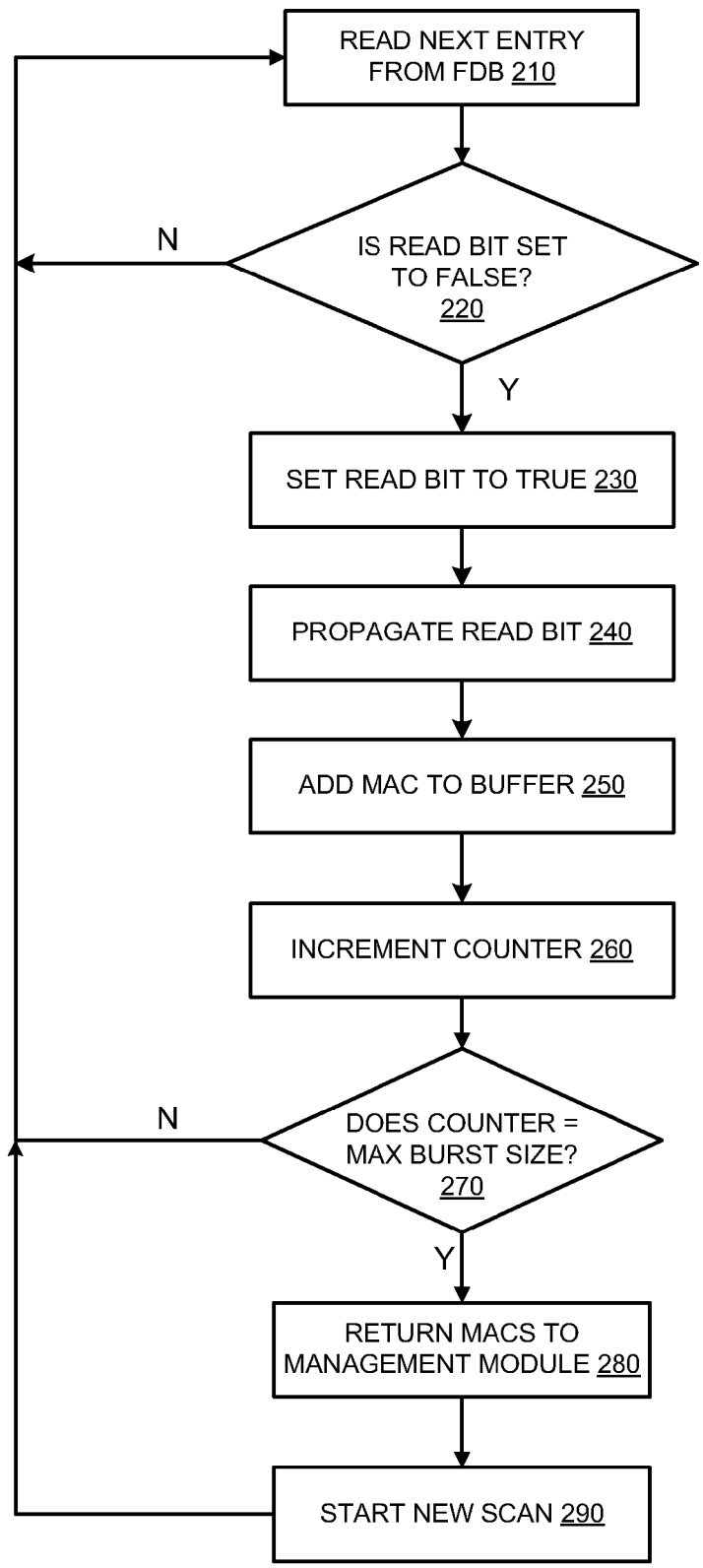
FIG. 2A is a flow diagram of operation in a system according to various embodiments.

FIG. 2A is a flow diagram of operation according to various embodiments. An entry is read 210 from a forwarding database. The state of the read bit associated with the entry is then determined 220. As shown in FIG. 2A, in some embodiments, it may be determined whether the read bit associated with the entry is set to false (or low, or 0). Of course, in other embodiments, one of skill in the art will appreciate that it could just as easily be determined whether the read bit is set to true (or "1" or high) instead of false. As described previously, each entry in a forwarding database has a corresponding read bit in a read-bit array that indicates whether or not the entry has been read. Thus, as shown in FIG. 2A, a "false" read bit indicates that the entry has not previously been read. But, again, a "true" read bit could also indicate that the forwarding database entry has previously not been read—it is simply a matter of convention.

In the case where it is determined, based on the state of the read bit, that the entry has been read, then no further action is taken on that entry and the next entry is read from the forwarding database. However, if the read bit for the forwarding database entry indicates an unread entry, then a series of actions are performed. It should be noted that actions 230-260 can be performed in an order that is different than is shown in FIG. 2A. In other words, the order of the action is not as important as the actions themselves. Thus, if the entry has not been previously read, one of the actions is to update 230 the state of the read bit to indicate the entry has been read. The address associated with the entry (i.e., the entry read in step 210) is then added 250 to a buffer. Additionally, a counter is incremented 260 in various embodiments. The counter can be used to indicate when the buffer reaches a threshold (e.g., when the buffer is full). Again, each of the actions 230 through 260 can be performed in various orders in different embodiments.

It is determined 270 whether the counter equals the maximum burst size for sending data to a management module. The max burst size can be equal to the size of the buffer, although the max burst size can be different the size of the buffer as well. If the counter has not reached the maximum burst size, then the scan continues and the next entry if read from the forwarding database. If, however, the counter has reached the maximum burst size, then the addresses (e.g., MAC addresses) in the buffer are returned, or sent, 280 to management module. A new scan may be started 290 after sending the contents of a full buffer to the management module. The scan starts anew the process of reading a next entry from the forwarding database.

Figure 2B:
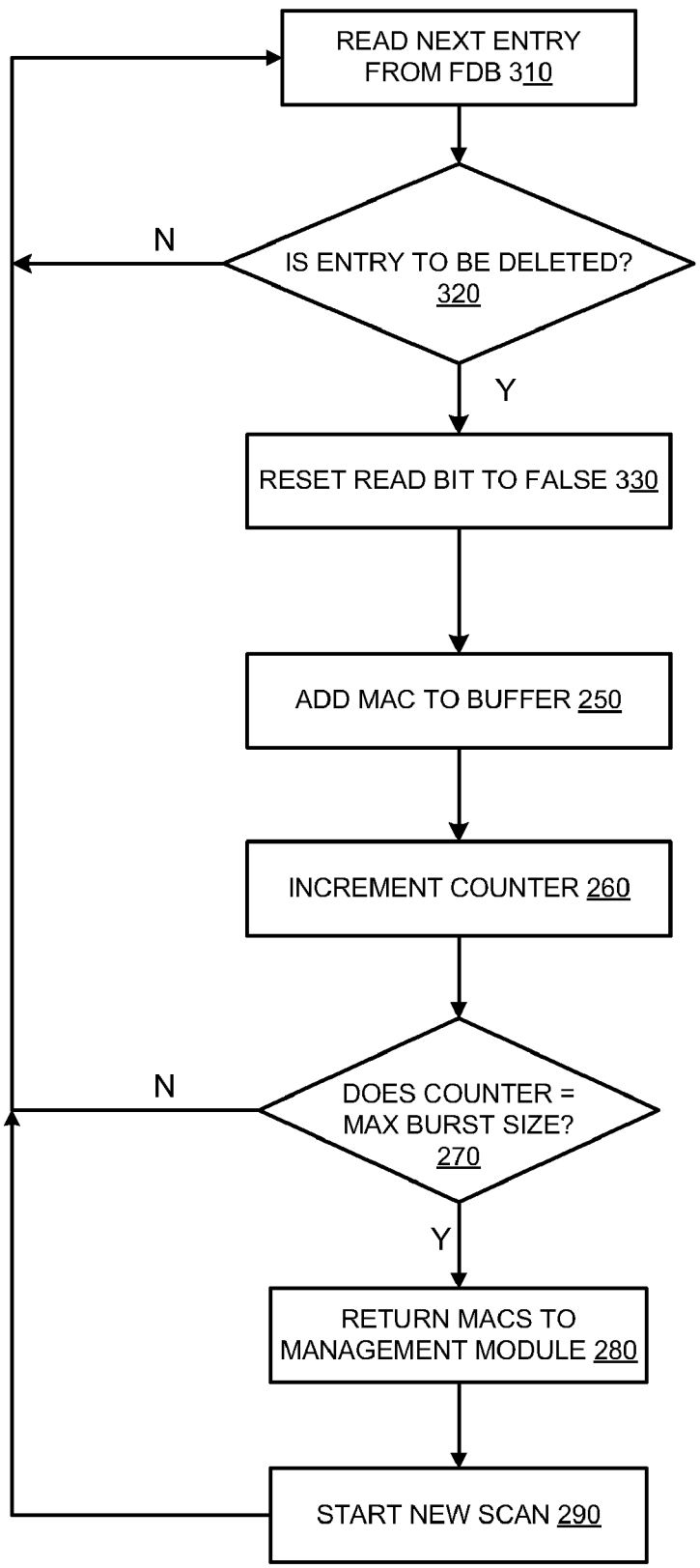
FIG. 2B is a flow diagram of operation in a system according to various embodiments

FIG. 2B is a flow diagram of operation according to various embodiments. The flow diagram of FIG. 2B specifically illustrates an example of an aging scan, whereas FIG. 2A illustrates an example of a read scan. As shown, an entry is read 310 from a forwarding database. It is then determined 320 whether the entry is to be deleted. As discussed previously, an age bit for a forwarding entry in an age-bit array could be used to indicate whether, or not, an entry should be deleted. In alternate embodiments, more the one age bit could be used for each entry. If the entry is not to be deleted, then the next entry is simply read from the FDB. However, if the entry is to be deleted, the read bit associated with the forwarding database entry in the read-bit array is reset 330 to indicate an unread state. As shown, the unread state is "false". But again, one of skill in the art will appreciate that a "true" read bit could be used to indicate an unread state.

Given that the resetting of the read bit indicates an unread status for the forwarding database entry, the address (e.g., MAC address) associated with the forwarding database entry is added 350 to the buffer. In connection with adding the address to the buffer, a counter may be incremented 360. If it is determined 370 that the counter does not equal the burst size for sending address data back to a management module, then the next entry is simple read from the forwarding database. If, however, the counter is equal to the defined burst size, then the addresses (e.g., MAC addresses) in the buffer are returned, or sent, 380 to a management module for further analyzing and/or processing. After the sending of the addresses to the management module, a new scan may be started 390.

Elements of embodiments may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, or other type of machine-readable media suitable for storing electronic instructions. For example, embodiments of the invention may be downloaded as a computer program which may be transferred from a memory on a remote computer (e.g., a server) to a memory on a requesting computer (e.g., a client).

Various components described herein may be a means for performing the functions described herein. Each component described herein includes software, hardware, or a combination of these. The operations and functions described herein can be implemented as software modules, hardware modules, special-purpose hardware (e.g., application specific hardware, application specific integrated circuits (ASICs), digital signal processors (DSPs), etc.), embedded controllers, hardwired circuitry, etc.

Aside from what is described herein, various modifications may be made to the disclosed embodiments and implementations of the invention without departing from their scope. Therefore, the illustrations and examples herein should be construed in an illustrative, and not a restrictive sense.

What is claimed is:

1. A computer-implemented method, comprising:
    scanning forwarding database (FDB) entries in a memory of a network device, the network device comprising a plurality of ports, wherein each port of the plurality of ports on the network device maintaining an FDB in the memory, wherein scanning comprises:
    reading an FDB entry in memory;
    determining the state of a read bit associated with the FDB entry; and
    if the state of the read bit indicates an unread state for the FDB entry:
        updating the state of the read bit associated with the FDB entry to indicate that the FDB entry has been read, including propagating the updated state of the read bit to FDB entries in the memory having the MAC address, and
        adding a MAC address of the FDB entry to a buffer; and
    automatically sending to a management module a filtered list of FDB entries, wherein automatically sending the filtered list of FDB entries comprises sending media access control (MAC) addresses in the buffer to the management module when buffer usage reaches a threshold associated with previously unread FDB entries.

2. The computer-implemented method of claim 1, further comprising:
    modifying an FDB entry; and
    updating the state of the read bit associated with the modified FDB entry to indicate an unread state.

3. The computer-implemented method of claim 1, further comprising:
    updating the state of the read bit associated with an FDB entry to be deleted to indicate an unread state; and
    adding the FDB entry to be deleted to the buffer.

4. A non-transitory computer-readable storage medium having instructions, that when executed cause a computer to:
    scan forwarding database (FDB) entries in a memory of a network device, the network device comprising a plurality of ports, wherein each port of the plurality of ports on the network device maintaining an FDB in the memory, wherein to scan comprises:
    read an FDB entry in memory;
    determine the state of a read bit associated with the FDB entry; and
    if the state of the read bit indicates an unread state for the FDB entry,
        update the state of the read bit associated with the FDB entry to indicate that the FDB entry has been read, including to propagate the updated state of the read bit to FDB entries in the memory having the MAC address, and
        add a MAC address of the FDB entry to a buffer; and automatically send a filtered list of FDB entries to a management module when the buffer usage reaches a threshold, wherein the filtered list of FDB entries comprises media access control (MAC) addresses in the buffer that are associated with the previously unread FDB entries in the buffer.

5. The non-transitory computer-readable storage medium of claim 4, comprising further instructions that cause the computer to:
modify an FDB entry; and
update the state of the read bit associated with the modified FDB entry to indicate an unread state.

6. The non-transitory computer-readable storage medium of claim 4, comprising further instructions that cause the computer to:
update the state of the read bit associated with an FDB entry to be deleted to indicate an unread state; and
add the FDB entry to be deleted to the buffer.

7. A network device, comprising:
a plurality of ports, each port to maintain a forwarding database (FDB) of FDB entries;
a memory to store the FDB entries;
a scanner to scan the FDB entries in the memory, wherein the scanner comprises:
a reader to read an FDB entry in memory;
a status module to flag a read bit associated with the FDB entry if the read bit indicates an unread state for the FDB entry;
an update module to:
add a MAC address of the FDB entry to a buffer, and
update the state of the flagged read bit associated with the FDB entry to indicate that the FDB entry has been read, and
to propagate the updated state of the read bit to FDB entries in the memory having the MAC address; and
a message module to send a filtered list of FDB entries to an external management module, wherein the message module to send a filtered list of FDB entries to the external management module is to send media access control (MAC) addresses associated with previously unread FDB entries.

8. The network device of claim 7, further comprising:
the update module to update the state of the read bit associated with the FDB entry to indicate an unread state in response to a modification of an FDB entry.

9. The network device of claim 7, further comprising:
the update module to update the state of the read bit associated with an FDB entry to be deleted to indicate an unread state and to add the FDB entry to be deleted to the buffer.

* * * * *